United States Patent Office 3,579,473
Patented May 18, 1971

3,579,473
EPOXY SOLDERS
George A. Salensky, Metuchen, N.J., assignor to Union Carbide Corporation, New York, N.Y.
No Drawing. Filed Dec. 27, 1968, Ser. No. 787,555
The portion of the term of the patent subsequent to June 10, 1986, has been disclaimed
Int. Cl. C09g 51/06, 51/04, 31/12
U.S. Cl. 260—18
13 Claims

ABSTRACT OF THE DISCLOSURE

This invention relates to epoxy solders, containing a talc of specified properties, which are characterized by excellent thermal shock resistance, and cure speed and adhesion to oil contaminated surfaces.

---

This invention relates to curable compositions, based on cycloaliphatic diepoxides and dimers of unsaturated fatty acids, which contain talc of specified properties. More particularly, this invention relates to curable, thixotropic compositions, excellently suited for use as epoxy body solders, containing talc of specified properties, which are characterized by excellent thermal shock resistance and cure speed.

Epoxy solders are made up of a number of ingredients, including in some instances talc, which are admixed together to provide compositions which are characterized, ostensibly, by excellent physical properties such as thermal shock resistance and cure speed. It has been found, however, that due to the variable composition of normally available talcs, epoxy solders containing talcs have been characterized, in some instances, by poor thermal shock resistance and cure speed. Consequently, it has been necessary to make formulation adjustments in order to obtain compositions having the desired thermal shock resistance and cure speed.

The present invention eliminates the necessity of making formulation adjustments with respect to compositions containing talc in order to obtain compositions, suitable for use as epoxy body solders, which are characterized by a uniformity of physical properties including excellent thermal shock resistance and cure speed.

The talc which is used in accordance with the present invention has the following properties:

pH (ASTM D1208–65)—<9
Loss of weight on ignition (ASTM D1208–65)—<6 percent by weight
Sulfuric acid soluble substances (U.S. Pharmacopea #17)—<2 percent by weight
Calcium content expressed as CaO (U.S. Pharmacopea #17)—<5 percent by weight
Moisture content (ASTM D1208–52T)—<0.1 percent by weight
Electrical resistance (ASTM D2448–66T)—greater than 10,000 ohm-cm.

Talc suitable for purposes of this invention is mined in North Carolina and Italy. Talc not having the specified properties can be upgraded to meet these properties by being subjected to a dilute sulfuric acid wash, followed by a water wash to remove residual sulfuric acid and then followed by a drying operation. Sulfuric acid washed talcs having the specified properties are available through Whittaker, Clark and Daniels and are designated as #111, #117, #125 and #140.

Other ingredients which are admixed with the talc, as described, are the following:

(a) Diepoxides of cycloaliphatic esters of dicarboxylic acids having the formula:

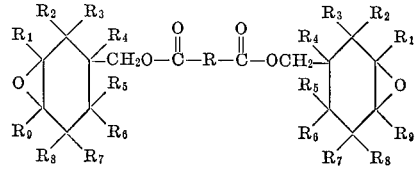

wherein $R_1$ through $R_9$, which can be the same or different are hydrogen or alkyl radicals generally containing 1 to 9 carbon atoms inclusive and preferably containing 1 to 3 carbon atoms inclusive as for example methyl, ethyl, n-propyl, n-butyl, n-hexyl, 2-ethylhexyl, n-octyl, n-nonyl and the like; R is a divalent hydrocarbon radical generally containing 3 to 9 carbon atoms inclusive and preferably containing 4 to 6 carbon atoms inclusive, as for example, alkylene radicals, such as trimethylene, tetramethylene, pentamethylene, hexamethylene, 2-ethylhexamethylene, octamethylene, nonamethylene, and the like; cycloaliphatic radicals, such as 1,4-cyclohexane, 1,3-cyclohexane, 1,2-cyclohexane, and the like.

Among specific diepoxides of cycloaliphatic esters of dicarboxylic acids are the following:

Bis(3,4-epoxycyclohexylmethyl)oxalate,
Bis(3,4-epoxycyclohexylmethyl)adipate,
Bis(3,4-epoxy-6-methylcyclohexylmethyl)adipate,
Bis(3,4-epoxycyclohexylmethyl)pimelate, and the like. Other suitable compounds are described in U.S. Pat. 2,750,395 to B. Phillips et al.

(b) A 3,4-epoxycyclohexylmethyl 3,4-epoxycyclohexane carboxylate having the formula:

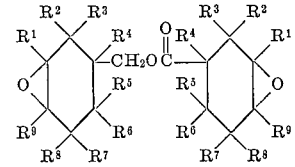

wherein $R^1$ through $R^9$, which can be the same or different, are as defined for $R_1$ in (a).

Among specific compounds falling within the scope of the above formula are the following: 3,4-epoxycyclohexylmethyl, 3,4-epoxycyclohexanecarboxylate, 3,4-epoxy-1-methylcyclohexylmethyl 3,4-epoxy-1-methylcyclohexanecarboxylate, 6-methyl - 3,4 - epoxycyclohexylmethyl 6-methyl-3,4-epoxycyclohexanecarboxylate, 3,4 - epoxy-3-methylcyclohexylmethyl 3,4-epoxy-3-methylcyclohexanecarboxylate, 3,4-epoxy-5-methylcyclohexylmethyl 3,4-epoxy-5-methylcyclohexanecarboxylate. Other suitable compounds are described in U.S. Pat. 2,890,194 to B. Phillips et al.

(c) A dimer of an unsaturated monobasic fatty acid as for example dimers of acids having the formula:

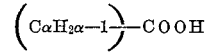

wherein $\alpha$ is an integer having a value of 6 to 20 inclusive such as $\Delta^{9,10}$-decylenic acid, $\Delta^{9,10}$-dodecylenic acid, palmitoleic acid, oleic acid, petroselinic acid, vaccenic acid and the like and dimers of unsaturated acids having the formula:

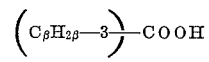

wherein $\beta$ is an integer having a value of 6 to 20 inclusive such as linoleic acid and the like. Other suitable dimers are enumerated in U.S. Pat. 2,994,660.

(d) Anhydrides of polybasic acids as for example, phthalic anhydride, tetrahydrophthalic anhydride, hexahydrophthalic anhydride, chlorendic anhydride, maleic anhydride, chloromaleic anhydride, dichloromaleic anhydride, glutaric anhydride, adipic anhydride, succinic anhydride, itaconic anhydride, heptylsuccinic anhydride, hexylsuccinic anhydride, methylbutylsuccinic anhydride, methyltetrahydrophthalic anhydride, nonenylsuccinic anhydride, octenylsuccinic anhydride, pentenylsuccinic anhydride, propylsuccinic anhydride, 1,2,4,5-benzentetracarboxylic dianhydride, citraconic anhydride, 4-nitrophthalic anhydride, 1,2-naphthalic anhydride, 2,3-naphthalic anhydride, 1,8-naphthalic anhydride, tetrabromophthalic anhydride, and tetraiodophthalic anhydride. Also suitable are cyclopentanetetracarboxylic dianhydride, benzophenonetetracarboxydianhydride, trimellitic anhydride. Polymeric anhydrides or mixed polymeric anhydrides of sebacic, maleic, adipic, pimelic, terephthalic and isophthalic acids are also suitable. Other suitable anhydrides are enumerated in U.S. Pat. 3,117,099 to Proops et al.

(e) Stannous acylates having the formula:

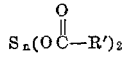

wherein R' is a monovalent hydrocarbon radical generally containing 2 to 12 carbon atoms inclusive and preferably containing 3 to 10 carbon atoms inclusive. Specific acylates falling within the scope of the formula above, wherein R' can be a saturated, unsaturated, branched or straight chain hydrocarbon radical, are: stannous propionate, stannous tartrate, stannous butyrate, stannous valerate, stannous caproate, stannous caprylate, stannous octoate, stannous laurate, stannous palmitate, stannous stearate, stannous oleate and the like.

(f) Cation exchanged bentonite. The cation exchanged bentonites are known compounds and are exemplified by those disclosed in U.S. Pat. 2,531,427 which are onium cation exchanged bentonite. Other suitable bentonites are those disclosed in U.S. Pat. 3,102,823 to J. P. Manasia et al. which are quaternary ammonium cation exchanged bentonite. Among suitable cation exchanged bentonites are dimethyldidodecylammonium bentonite, dimethyldihexadecylammonium bentonite, dimethylhexadecyloctadecylammonium bentonite, dimethyloctadecylbenzylammonium bentonite, dimethyldioctadecylammonium bentonite and the like. Also suitable are the commercially available cation exchanged bentonites supplied by National Lead Co. under the designation "Bentone." Particularly desirable bentonites have a moisture content of 0.5 to about 3 percent by weight.

The amount of materials used to formulate the compositions of this invention are as follows:

(a) Diepoxides of cycloaliphatic esters of dicarboxylic acids—about ⅓ to about 3 equivalents and preferably about ½ to about 2 equivalents (based on the epoxy groups) per equivalent of:

(b) A 3,4-epoxycyclohexylmethyl, 3,4-epoxycyclohexanecarboxylate (based on the epoxy groups).

(c) Dimer of an unsaturated monobasic fatty acid about 0.3 to about 0.6 and preferably about 0.4 to about 0.5 equivalent (based on the carboxy groups) per total epoxy equivalent.

(d) Anhydrides of polybasic acids—about 0.005 to about 0.2 and preferably about 0.02 to about 0.09 equivalent (based on the anhydride groups) per 100 parts by weight of dimer of an unsaturated monobasic fatty acid (c).

(e) Stannous acylate—about 3 to about 10 and preferably about 4 to about 8 parts by weight per 100 parts by weight of dimer of an unsaturated monobasic fatty acid (c).

(f) Cation exchanged bentonite—about 6 to about 14 and preferably about 8 to about 11 parts by weight per 100 parts by weight diepoxide [(a+b)] plus about 9 to about 16 and preferably about 11 to about 15 parts by weight per 100 parts by weight dimer of an unsaturated monobasic fatty acid (c).

(g) Talc—about 60 to about 140 and preferably about 80 to about 120 parts by weight per 100 parts by weight diepoxide [(a+b)] plus about 40 to about 110 and preferably about 58 to about 90 parts by weight per 100 parts by weight of dimer of an unsaturated monobasic fatty acid (c).

In formulating the compositions of this invention, it is convenient, from a processing standpoint, to prepare a so-called resin portion and a so-called hardener portion and to then blend the two portions together in a paste mixer, such as a Pyles' Mixer, at room temperature. A typical resin portion and a typical hardener portion are indicated below.

Resin portion:
    Diepoxide of a cycloaliphatic ester of a dicarboxylic acid
    A 3,4-epoxycyclohexylmethyl 3,4-epoxycyclohexane carboxylate
    Cation exchanged bentonite
    Talc Hardener portion:
    Dimer of an unsaturated monobasic fatty acid
    Cation exchanged bentonite
    Talc
    Anhydride of a polybasic acid
    A stannous acylate It is to be understood that there may be added to these compositions, through the resin portion or through the hardener portion, such additives as pigments such as carbon black and the like, processing aids such as propylene carbonate, accelerators such as borontrifluoride or complexes thereof and the like in amounts well known to those skilled in the art.

The compositions of this invention have excellent cure speed, on the order of less than about 10 minutes at 350° F. The curing cycle in each case will depend in part upon the exact formulation of the compositions as well as the temperature to which the compositions are subjected. At room temperature, about 780 F., the compositions of this invention remain stable for a period of time in excess of 24 hours.

The following examples further illustrate the present invention and are not intended to limit the scope thereof in any manner.

EXAMPLE 1

A composition was formulated by blending the ingredients of a "resin portion" and a "hardener portion" in a Pyles' Mixer, applied to the lap joint of two steel panels which had been contaminated with lubricating oil and subjected to the tests subsequently described. The lap joint was joined by spot welds and was depressed about ¼ of an inch from the normal contour of the panels to allow for filling and masking of the joint by the solder.

| | Parts by weight | Equivalents |
|---|---|---|
| Resin portion: | | |
| Bis(3,4-epoxy-6-methylcyclohexyl methyl) adipate-assay equals 216 gm./gm. mole epoxy | 12.16 | 0.0563 |
| 3,4-epoxycyclohexylmethyl 3,4-epoxycyclohexane carboxylate-assay equals 131 gm./gm. mole epoxy | 14.86 | 0.1135 |
| Dimethyloctadecylbenzylammonium bentonite | 2.53 | |
| Talc (magnesium silicate) | 27.01 | |
| Propylene carbonate | 0.81 | |
| Carbon black | 0.03 | |
| Hardener portion: | | |
| Dimer of linoleic acid | 20.82 | 0.074 |
| Dimethyloctadecylbenzylammonium bentonite | 2.70 | |
| Talc (magnesium silicate) | 15.36 | |
| Hexahydrophthalic anhydride | 1.77 | 0.0115 |
| Stannous octoate | 1.17 | |
| Propylene carbonate | 0.78 | |

This composition was thixotropic, did not sag and cured in 8 minutes at 350° F. to an infusible product. The cured product had excellent hot sanding and feathering properties, had excellent adhesion as it did not pull away from the panel when subjected to the Thermal Shock Test and had excellent impact strength as it did not lose adhesion on being dropped from a height of six feet as described in the Cold Impact Test.

EXAMPLE 2

A second composition was formulated by blending the ingredients of a "resin portion" and a "hardener portion," in a Pyles' Mixer, applied to the lap joint of two steel panels which had been contaminated with lubricating oil and subjected to the tests subsequently described.

|  | Parts by weight | Equivalents |
| --- | --- | --- |
| Resin portion: |  |  |
| Bis(3,4-epoxy-6-methylcyclohexylmethyl) adipate | 21.70 | 0.100 |
| 3,4-epoxycyclohexylmethyl 3,4-epoxycyclohexane carboxylate | 6.59 | 0.050 |
| Dimethyldioctadecylammonium bentonite | 2.62 |  |
| Talc (magnesium silicate) | 28.35 |  |
| Propylene carbonate | 0.91 |  |
| Carbon black | 0.03 |  |
| Hardener portion: |  |  |
| Dimer of linoleic acid | 20.40 | 0.0725 |
| Dimethyldioctadecylammonium bentonite | 2.48 |  |
| Talc (magnesium silicate) | 13.75 |  |
| Hexahydrophthalic anhydride | 1.06 | 0.007 |
| Stannous octoate | 1.30 |  |
| Propylene carbonate | 0.81 |  |

This composition was thixotropic, did not sag and cured in 8 minutes at 350° F. to an infusible product. The cured product had excellent hot sanding and feathering properties, had excellent adhesion as it did not pull away from the panel when subjected to the Thermal Shock Test and had excellent impact strength as it did not lose adhesion on being dropped from a height of six feet as described in the Cold Impact Test.

EXAMPLE 3

This composition was formulated with the same materials as described for the composition of Example 1 with the exception that the composition of this example contained 0.007 anhydride equivalents of benzophenone tetracarboxylic acid dianhydride.

This composition cured to an infusible product in 5 minutes at a temperature of 350° F. and its properties were comparable to the properties of the composition of Example 1.

The talc used in Examples 1–3 had the following properties:

ph—8.0%
Loss of weight on ignition—0.9%
Sulfuric acid soluble substances—0.2%
Calcium content expressed as CaO—0.05%
Moisture content—0.08%
Electrical resistance—15,000 ohm-cm.

In order to further show the excellent properties of the compositions of this invention, two compositions were formulated, Control 1 and Control 2, which were identical to the composition of Example 1 with the exception that the talc had the following properties.

|  | Control 1 | Control 2 |
| --- | --- | --- |
| pH | 9.5 | 9.4 |
| Sulfuric acid soluble substances, percent | >2 | >2 |
| Loss of weight on ignition, percent | 12.0 | 14 |
| Calcium expressed as CaO, percent | 6.0 | 7.0 |
| Moisture content, percent | .1 | .1 |
| Electrical resistance, ohm-cm | 4,000 | 2,300 |

Control 1 had a cure speed of 15 minutes at 350° F. and had poor thermal shock resistance as evidenced by the fact that there was a loss of adhesion after the first heat cold water quench cycle.

Control 2 had a cure speed of 20 minutes at 350° F. and had poor shock resistance as evidenced by the fact that there was a loss of adhesion after the second heat-cold water quench cycle.

It is to be understood that the mixtures of materials can be utilized in formulating the compositions of this invention.

Also, the disclosure of all references noted in this application are incorporated herein.

Tests referred to in this application were conducted as follows:

Sag test

Panels were placed upright in an oven which was at a temperature of 350° F. and examined visually for any sag or run off until the solder cured to an infusible product.

Cure speed test

Panels were placed upright in an oven which was at a temperature of 350° F. and the time within which the solder cured to an infusible product, noted.

Hot sanding and feathering test

Panels were placed upright in an oven which was at a temperature of 350° F., removed from the oven when the solder cured to an infusible product and two minutes thereafter sanded using a 60 mesh disc and feathered using an 80 mesh disc.

Thermal shock test for adhesion

Panels were placed upright in an oven which was at a temperature of 350° F., removed from the oven after twenty minutes and quenched in cold tap water. This was repeated five times for each panel. Visual examination was then made of each panel in order to determine whether there was any loss of adhesion of the solder.

Cold impact strength

Panels, treated as described for the Thermal Shock Test were cooled to −10° F. and maintained at −10° F. for three hours and then dropped on a concrete floor from a height of six feet. The panels were then examined visually in order to determine whether there was any loss of adhesion of the solder.

What is claimed is:
1. A curable composition comprising:
(a) about ⅓ to about 3 equivalents of a diepoxide of a cycloaliphatic ester of a dicarboxylic acid having the formula:

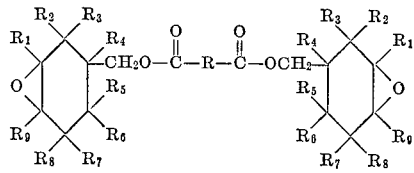

wherein $R_1$ through $R_9$ are hydrogen or alkyl radicals containing 1 to 9 carbon atoms inclusive and R is a divalent hydrocarbon radical containing 3 to 9 carbon atoms inclusive, per equivalent of
(b) a carboxylate having the formula:

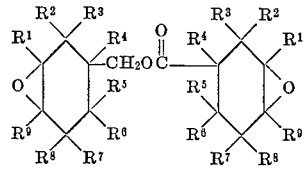

wherein $R^1$ through $R^9$ are as defined for $R_1$,
(c) a dimer of an unsaturated monobasic fatty acid in an amount of about 0.3 to about 0.6 equivalent per total epoxy equivalent;

(d) an anhydride of a polybasic acid in an amount of about 0.005 to about 0.2 equivalent per 100 parts by weight of (c);
(e) stannous acylate in an amount of about 3 to about 10 parts by weight per 100 parts by weight (c);
(f) onium cation exchange bentonite in an amount of about 6 to about 14 parts by weight per 100 parts by weight of (a)+(b) plus about 9 to about 16 parts by weight per 100 parts by weight (c);
(g) Talc in an amount of about 60 to about 140 parts by weight per 100 parts by weight of (a)+(b) plus about 40 to aobut 110 parts by weight per 100 parts by weight of (c), said talc having the following properties:

pH—<9
Loss of weight on ignition—<6 percent by weight
Sulfuric acid soluble substances—<2 percent by weight
Calcium content expressed as CaO—<5 percent by weight
Moisture content—<0.1 percent by weight
Electrical resistance—greater than 10,000 ohm-cm.

2. A curable composition as defined in claim 1 comprising: about ½ to about 2 equivalents of (a) per equivalent of (b); an amount of (c) of about 0.4 to about 0.5 equivalents per total epoxy equivalent; an amount of (d) of about 0.02 equivalents to about 0.09 equivalents per 100 parts by weight (c); an amount of (e) of about 4 to about 8 parts by weight per 100 parts by weight (c); an amount of (f) of about 8 to about 11 parts by weight per 100 parts of weight (a)+(b) and plus about 11 parts to about 15 parts by weight per 100 parts by weight (c); an amount of (g) of about 80 to about 120 parts by weight per 100 parts by weight of (a)+(b) plus about 58 to about 90 parts by weight per 100 parts by weight of (c).

3. The cured product of the composition defined in claim 1.

4. A composition as defined in claim 1 wherein (a) is bis(3,4-epoxy-6-methylcyclohexylmethyl)adipate.

5. A composition as defined in claim 1 wherein (b) is 3,4-epoxycyclohexylmethyl 3,4-epoxycyclohexane carboxylate.

6. A composiiton as defined in claim 1 wherein (c) is the dimer of linoleic acid.

7. A composition as defined in claim 1 wherein (d) is hexahydrophthalic anhydride.

8. A composition as defined in claim 1 wherein (d) is a mixture of hexahydrophthalic anhydride and benzophenonetetracarboxylic acid dianhydride.

9. A composition as defined in claim 1 wherein (e) is stannous octoate.

10. A composition as defined in claim 1 wherein (f) is dimethyldioctadecylammonium bentonite.

11. A composition as defined in claim 1 wherein the bentonite is a quaternary ammonium cation exchanged bentonite.

12. A composition as defined in claim 1 wherein (f) is dimethyloctadecylbenzylammonium bentonite.

13. A composition as defined in claim 1 wherein (f) has a moisture content of about 0.5 to about 3 percent by weight.

References Cited
UNITED STATES PATENTS
3,449,274   6/1969   Salensky _____ 260—830X DONALD E. CZAJA, Primary Examiner C. W. IVY, Assistant Examiner U.S. Cl. X.R.
156—330; 161—186; 260—37, 830